United States Patent
Islam et al.

(10) Patent No.: US 11,063,342 B2
(45) Date of Patent: Jul. 13, 2021

(54) PARASITIC PATCH ANTENNA FOR RADIATING OR RECEIVING A WIRELESS SIGNAL

(71) Applicant: Motorola Mobility LLC, Chicago, IL (US)

(72) Inventors: Md Rashidul Islam, Glen Ellyn, IL (US); Eric Krenz, Crystal Lake, IL (US); Mohammed Abdul-Gaffoor, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 27 days.

(21) Appl. No.: 16/571,030

(22) Filed: Sep. 13, 2019

(65) Prior Publication Data

US 2021/0083363 A1    Mar. 18, 2021

(51) Int. Cl.
| | |
|---|---|
| *H01Q 1/24* | (2006.01) |
| *H01Q 5/49* | (2015.01) |
| *H04B 1/38* | (2015.01) |
| *H04M 1/00* | (2006.01) |
| *H01Q 9/04* | (2006.01) |
| *H01Q 19/00* | (2006.01) |
| *H04M 1/02* | (2006.01) |

(52) U.S. Cl.
CPC ........... *H01Q 1/243* (2013.01); *H01Q 9/0407* (2013.01); *H01Q 19/005* (2013.01); *H04M 1/026* (2013.01)

(58) Field of Classification Search
None
See application file for complete search history.

(56) References Cited

U.S. PATENT DOCUMENTS

| | | | |
|---|---|---|---|
| 6,982,672 B2 * | 1/2006 | Lin .......................... | H01Q 1/38 343/700 MS |
| 7,053,841 B2 * | 5/2006 | Ponce De Leon ..... | H01Q 1/243 343/700 MS |
| 7,183,984 B2 * | 2/2007 | Jarmuszewski ........ | H01Q 1/243 343/702 |

(Continued)

FOREIGN PATENT DOCUMENTS

WO    WO 02/071536    * 9/2002    ............... H01Q 1/24

OTHER PUBLICATIONS

Mestdagh et al., "CPW-Fed Stacked Microstrip Antenna", IEEE Transactions on Antennas and Propagation, vol. 52, No. 1, pp. 74-83, Jan. 2004.

(Continued)

*Primary Examiner* — Tuan A Tran
(74) *Attorney, Agent, or Firm* — Loppnow & Chapa

(57) ABSTRACT

The present application provides a parasitic patch antenna for radiating or receiving a wireless signal. The parasitic patch antenna includes an antenna module, which has one or more exciter patches, where each exciter patch is respectively coupled to a signal port of one of a transmitter, a receiver, or a transceiver, and has a ground structure. The parasitic patch antenna further includes a separate mechanical part independent of the antenna module. The separate mechanical part includes one or more parasitic patches organized and arranged separate from, and proximate to the one or more exciter patches of the antenna module.

19 Claims, 7 Drawing Sheets

(56) References Cited

U.S. PATENT DOCUMENTS

| | | | | |
|---|---|---|---|---|
| 8,090,408 B2* | 1/2012 | Ochi | ................... | G06K 7/0021 |
| | | | | 455/558 |
| 8,138,981 B2* | 3/2012 | Anguera | .............. | H01Q 19/005 |
| | | | | 343/702 |
| 8,446,318 B2* | 5/2013 | Ali | ...................... | H01Q 1/1257 |
| | | | | 342/383 |
| 8,626,242 B2* | 1/2014 | Ono | .................... | H01Q 9/0414 |
| | | | | 455/562.1 |
| 8,717,241 B2* | 5/2014 | Shamblin | ............... | H01Q 1/243 |
| | | | | 343/702 |
| 9,160,074 B2* | 10/2015 | Desclos | ............... | H01Q 9/0421 |
| 9,190,732 B2* | 11/2015 | Fujii | ....................... | H01Q 1/38 |
| 9,461,691 B2* | 10/2016 | Yan | ........................ | H01Q 1/243 |
| 9,627,755 B2* | 4/2017 | Lin | ......................... | H01Q 1/243 |
| 10,186,756 B2* | 1/2019 | Dalmia | .................. | H01Q 19/30 |
| 10,454,156 B1* | 10/2019 | Yang | ....................... | H01Q 5/335 |
| 2001/0050643 A1* | 12/2001 | Egorov | ................... | H01Q 1/36 |
| | | | | 343/702 |
| 2005/0200537 A1* | 9/2005 | Jarmuszewski | .......... | H01Q 5/40 |
| | | | | 343/702 |
| 2011/0175776 A1* | 7/2011 | Anguera | .................. | H01Q 1/52 |
| | | | | 343/700 MS |
| 2016/0218431 A1* | 7/2016 | Gaddi | .................... | H01Q 1/243 |

OTHER PUBLICATIONS

Sittironnarit et al., "Analysis and Design of a Dual-Band Folded Microstrip Patch Antenna for Handheld Device Applications", Proceedings IEEE SoutheastCon 2002, pp. 255-258, 2002.

Malar Tamil Prabha et al., "Isolation Enhancement in Microstrip Antenna Arrays", International Journal of Communication and Computer Technologies, vol. 02—No. 18 Issue: 05, pp. 47-51, Jun. 2014.

Ghosh et al., "Mutual Coupling Reduction between Closely Placed Microstrip Patch Antenna Using Meander Line Resonator", Progress in Electromagnetics Research Letters, vol. 59, pp. 115-122, 2016.

* cited by examiner

PARASITIC PATCH ANTENNA FOR RADIATING OR RECEIVING A WIRELESS SIGNAL

FIELD OF THE APPLICATION

The present disclosure relates generally to a parasitic patch antenna for radiating or receiving a wireless signal, and more particularly, to a patch antenna having exciter patches and parasitic patches separately located on distinct mechanical elements.

BACKGROUND

New and developing wireless communication standards are increasingly incorporating the use of higher signal frequencies, as well as support for a wider spread of frequencies for remotely conveying information between communication participants. Additionally new forms of communication are increasingly implementing various forms of diversity, and carrier aggregation, to increase the ability of multiple devices to share the same or similar frequencies and/or to integrate multiple streams of data when communicating information.

However while the communication capabilities are expanding to support the new and emerging forms of communications, and correspondingly higher signal frequencies, the spatial constraints within a device for supporting the elements necessary to support wireless communications are generally still being physically constrained, in order to support a general preference from users for devices that are limited in overall size.

At least one form of antenna that is being increasingly used to accommodate wireless signaling via higher frequencies, such as in the 24-110 GHz range, are microstrip patch antenna arrays. Some vendors provide self contained assemblies that support these higher signaling frequencies, but they can be a challenge to implement while also attempting to meet preferred overall size constraints. This can be, because the self contained assemblies generally support within the overall package, space to support any parasitic elements for enhancing the overall operational characteristics, where the parasitic elements have a preference for certain spatial relationships relative to corresponding exciter patches that are generally accommodated within the self contained assemblies. Furthermore, the overall package of the self contained assembly, itself, can have spacing requirements relative to other nearby structures, such that when the overall package is integrated within a device, the self contained assembly can have further separation requirements that extend beyond the physical size of the overall package.

The present innovators have recognized that at least some of the parasitic patches, which can be used to address and/or fix frequency detuning, can be separated from the self contained antenna assembly, thereby allowing the overall assembly size in at least some instances to be reduced, as well as for at least some of the parasitic patches to be incorporated into other nearby structures, such as a separate mechanical part, where the desired spacing between the exciter patches and the respective parasitic patches can be accommodated through the spacing between the antenna module including the exciter patches, and the separate mechanical part which can incorporate and/or include at least some of the respective parasitic patches. This would allow the relative desired spacing to be accommodated by the distance between the respective types of patches associated with the separate structures/assemblies, while simultaneously accounting for the impact to performance of the other nearby structures.

SUMMARY

The present application provides a parasitic patch antenna for radiating or receiving a wireless signal. The parasitic patch antenna includes an antenna module, which has one or more exciter patches, where each exciter patch is respectively coupled to a signal port of one of a transmitter, a receiver, or a transceiver, and has a ground structure. The parasitic patch antenna further includes a separate mechanical part independent of the antenna module. The separate mechanical part includes one or more parasitic patches organized and arranged separate from, and proximate to the one or more exciter patches of the antenna module.

In at least one embodiment, the separate mechanical part can be included as part of an external housing for a wireless communication device. In some of these instances, the one or more parasitic patches can be positioned on a surface of the external housing.

In at least one embodiment, the separate mechanical part can be an antenna carrier. In some of these instances, the one or more parasitic patches can be positioned on a surface of the antenna carrier.

In at least one embodiment, the signal port of one of the transmitter, the receiver, or the transceiver can be incorporated as part of a radio frequency integrated circuit that is included as part of the antenna module.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
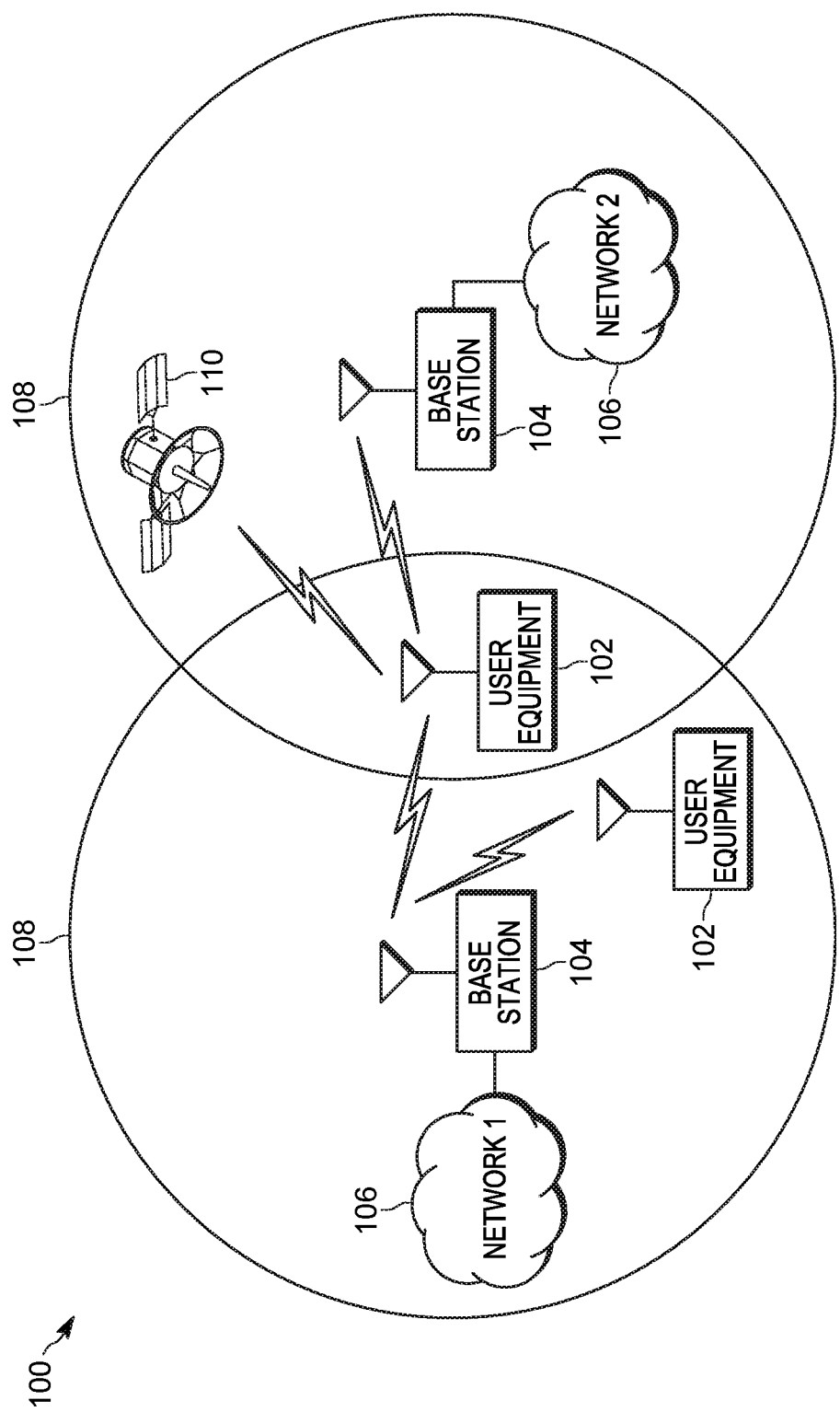
FIG. 1 is a block diagram of an exemplary network environment.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a block diagram of an exemplary network environment 100. The exemplary network environment 100 can include one or more wireless communication devices, such as user equipment 102, which might communicate directly with one another, or via one or more networks, each having an associated network infrastructure. For example, the network infrastructure can include one or more base stations 104, which in turn are coupled to other network elements, which correspond to one or more networks, and which are generally represented as clouds labeled network 106. The various base stations 104 can be associated with the same network or can be separately associated with different networks.

A base station 104 will generally have an expected associated area 108 of coverage, which defines the area over which wireless radio frequency signaling from the base station can generally reach. While the strength of wireless radio frequency signaling is generally affected by the range of transmission, within an expected area of coverage, terrain and/or other physical elements can impact the ability of the signaling to be perceived at particular locations within the expected area 108 of coverage. Depending upon the reception capabilities of the user equipment 102, the current signal strength of the signal being transmitted at a particular location will affect whether a particular user equipment 102 can send or receive data with a particular base station 104. As such, some networks 106 will make use of multiple geographically spaced apart base stations 104, to provide communication capabilities across a larger geographical area.

It is further possible that different base stations 104 can be more directly associated with different networks 106, which may interact with one another at different parts of the respective networks. The network(s) 106 can include any type of network that is capable of conveying signals between different associated elements of the network including the one or more user equipment 102.

In some instances, the user equipment 102 is generally a wireless communication device that could take the form of a radio frequency cellular telephone. However, the user equipment 102 could also take the form of other types of devices that could support wireless communication capabilities. For example, the different potential types of user equipment can include a tablet, a laptop computer, a desktop computer, a netbook, a cordless telephone, a selective call receiver, a gaming device, a personal digital assistant, as well as any other type of wireless communication device that might be used to support wireless forms of communication.

The various networks 106, base stations 104 and user equipment 102 could be associated with one or more different communication standards. A few examples of different communication standards that a particular network 106 could support include Global System for Mobile Communications (GSM), Code Division Multiple Access (CDMA), Orthogonal Frequency Division Multiple Access (OFDMA), Long Term Evolution (LTE), New Radio Access Technology (NR), Global Positioning System (GPS), Wi-Fi (IEEE 802.11), as well as various other communication standards. While many base stations 104 are ground based, in at least some instances, the user equipment 102 may be adapted for communicating with one or more satellites 110 in orbit, such as for receiving signals via which a position can be determined. It is possible that each network and/or associated element could support one or more different communication standards. It is also possible that different networks 106 can support one or more of the same standards. In addition, the wireless communication devices 102, base stations 104 and networks 106 may utilize a number of additional forms of communication and communication techniques including beamforming, signal diversity, multiple input and multiple output (MIMO), carrier aggregation, and simultaneous voice and data that concurrently enables the use of simultaneous signal propagation.

Figure 2:
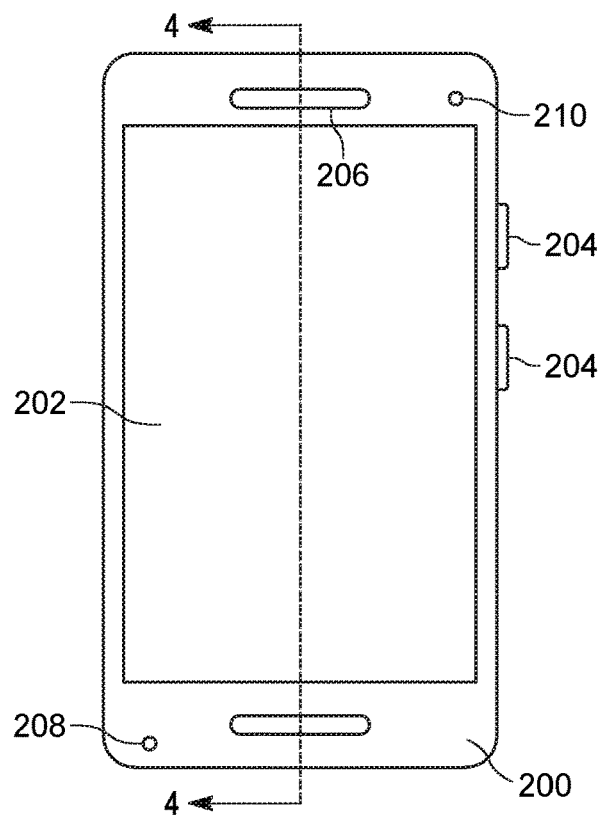
FIG. 2 is a front view of an exemplary wireless communication device, such as a radio frequency radio telephone.

FIG. 2 illustrates a front view of an exemplary electronic device 200. While in the illustrated embodiment, the type of electronic device shown is a radio frequency cellular telephone, other types of devices that incorporate wireless communication capabilities are also relevant to the present application. In other words, the present application is generally applicable to electronic devices beyond the type being specifically shown. A couple of additional examples of suitable electronic devices that may additionally be relevant to the present application in the incorporation of wireless communication capabilities can include a tablet, a cordless telephone, a selective call receiver, an audio player, a gaming device, a personal digital assistant, a wireless headset, as well as any other form of electronic device that engage in one or more forms of wireless communications. As noted previously, the electronics involving the incorporation and management of at least one or more types of wireless communication can also be included in an automobile, such as an electric car.

In the illustrated embodiment, the radio frequency cellular telephone includes a display 202 which covers a large portion of the front facing of the electronic device. In at least some instances, the display can incorporate a touch sensitive matrix, that facilitates detection of one or more user inputs relative to at least some portions of the display, including interaction with visual elements being presented to the user via the display 202. In some instances, the visual element could be an object with which the user can interact. In other instances, the visual element can form part of a visual representation of a keyboard including one or more virtual keys and/or one or more buttons with which the user can interact and/or select for actuation. In addition to one or more virtual user actuatable buttons or keys, the device 200 can include one or more physical user actuatable buttons 204. In the particular embodiment illustrated, the device has three such buttons located along the right side of the device.

The exemplary electronic device, illustrated in FIG. 2, additionally includes a speaker 206 and a microphone 208 in support of voice communications. The speaker 206 may additionally support the reproduction of an audio signal, which could be a stand-alone signal, such as for use in the playing of music, or can be part of a multimedia presentation, such as for use in the playing of a movie, which might have at least an audio as well as a visual component. The speaker 206 may also include the capability to also produce a vibratory effect. However, in some instances, the purposeful production of vibrational effects may be associated with a separate element, not shown, which is internal to the device. Generally, the speaker 206 is located toward the top of the device, which corresponds to an orientation consistent with the respective portion of the device facing in an upward direction during usage in support of a voice communication. In such an instance, the speaker 206 might be intended to align with the ear of the user, and the microphone 208 might be intended to align with the mouth of the user. Also located near the top of the device, in the illustrated embodiment, is a front facing camera 210.

Figure 3:
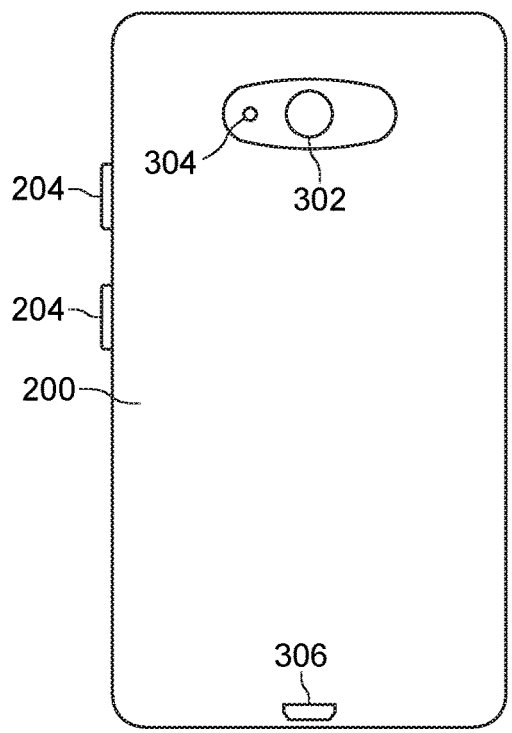
FIG. 3 is a back view of an exemplary wireless communication device.

FIG. 3 illustrates a back view of the exemplary electronic device 200, illustrated in FIG. 2. In the back view of the exemplary electronic device, the two physical user actuatable buttons 204, which are visible in the front view, can similarly be seen. The exemplary electronic device 200 additionally includes a back side facing camera 302 with a flash 304, as well as a serial bus port 306, which is generally adapted for receiving a cable connection, and which can be used to receive data and/or power signals.

While the respective front and back views illustrated in FIGS. 2 and 3 have prominently identified elements concerned with the manner and related structure associated with a user interfacing with the device, the device additionally includes circuitry and structure related to supporting wireless communications including circuitry related to producing and receiving a wireless signal and antennas structure, which facilitates the transitioning of the electromagnetic energy between a presence within a local conductor and electromagnetic energy that extends beyond the constraints of the immediate physical structure. In at least some instances, much of the circuitry and structure, but not necessarily all, which supports wireless communications can be internal to the device 200.

Figure 4:
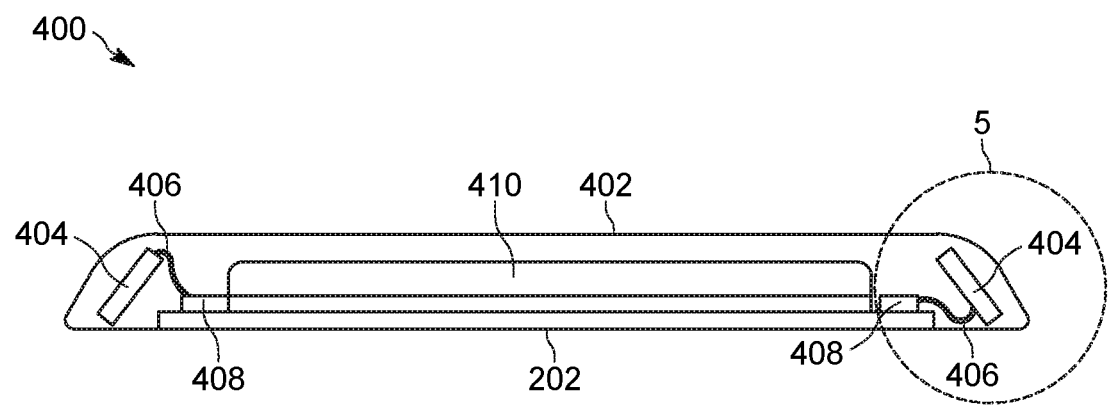
FIG. 4 is a cross sectional side view of an exemplary wireless communication device, such as the device illustrated in FIGS. 2 and 3.

FIG. 4 illustrates a cross sectional side view 400 of an exemplary wireless communication device 200, such as the device illustrated in FIGS. 2 and 3. The orientation of the device 200, as illustrated, positions the front facing of the device in a downward direction, and the back facing of the device 200 in an upward direction. Correspondingly, the display 202 can be seen at the bottom surface of the view 400. The top surface of the view 400, corresponds to the back side surface 402 of the device 200, which in some instances can correspond to the device housing. At each of opposite ends of the side view 400, are respective self contained parasitic patch antenna assemblies 404 for supporting the transmission and receipt of an appropriately tuned electromagnetic wireless signal. In the embodiment illustrated, corresponding to at least some prior antenna assemblies, the self contained assembly 404 includes both the exciter patches and the one or more sets of parasitic patches. Because the exciter patches are in the same self contained assembly as the one or more parasitic patches, the dimensions of the assembly will generally need to have a sufficient size to accommodate the desired spacing between the associated exciter patches and the related one or more parasitic patches. In this way the manufacturer of the entire assembly can have greater overall control, and can help to ensure that the desired spacing is maintained between the various sets of patches. However not only does this often result in an assembly having an increased depth to accommodate the desired spacing between included elements, but the assembly may also be sensitive to nearby elements that might encroach too closely upon the overall assembly, which may result in a decreased capacity to send or receive a wireless signal from the antenna array being detuned through the electromagnetic loading of nearby elements. Correspondingly, the entirety of the self-contained assembly may have additional space constraints relative to how close other nearby elements may be able to be spaced related to the respective antenna assembly 404. In some instances, it may be necessary to allow for a minimum gap or spacing in one or more directions, in which at least some external elements may need to be excluded. In some instances, the at least some external elements can include the housing of the device.

In at least some instances, the antenna assembly 404 can be coupled to corresponding circuit elements 408 for supporting wireless signaling, such as radio frequency front end circuitry, that can include power amplification, frequency filtering, and impedance matching elements, via a wired connection 406. Additional related circuitry can include transmitter, receiver, and/or transceiver circuit elements. The cross sectional side view 400 further illustrates a battery 410 that can be used to provide electrical power to at least some of the various electrical circuit elements.

Figure 5:
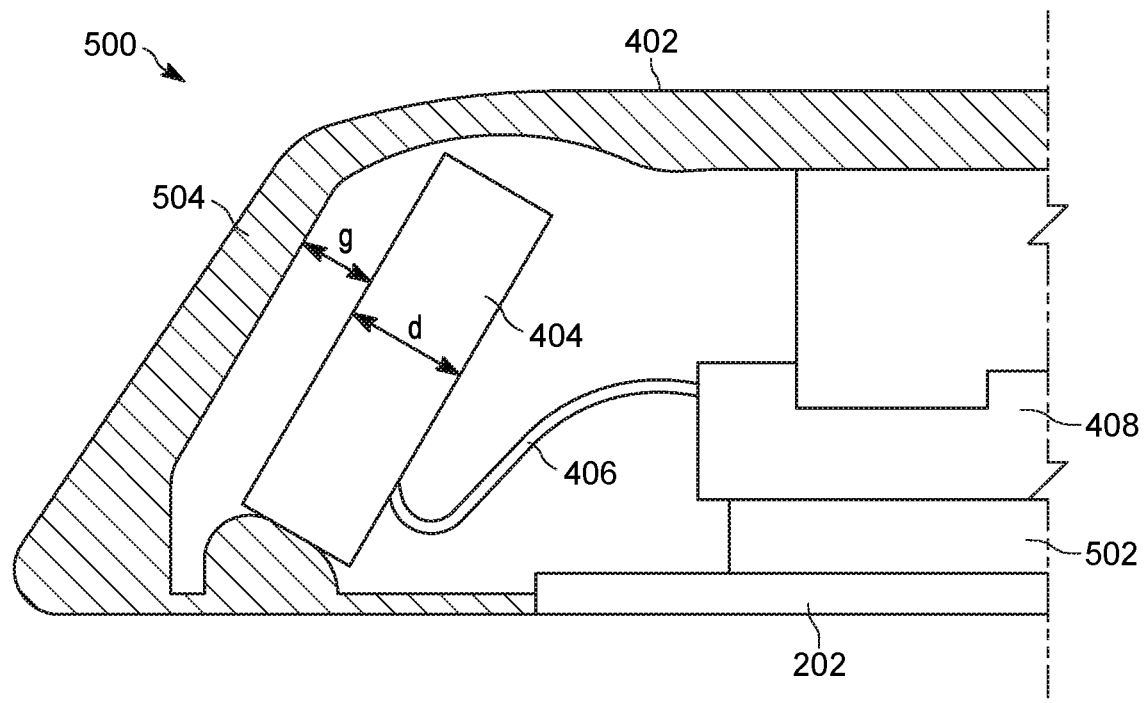
FIG. 5 is a partial enlarged cross sectional side view of an exemplary wireless communication device.

FIG. 5 illustrates a partial enlarged cross sectional side view 500 of the exemplary wireless communication device 200, illustrated in FIG. 4. The enlarged cross sectional side view 500 highlights the prior instance, where the antenna assembly is self contained to include both exciter patches and at least some parasitic patches. As previously noted, in order to allow for the inclusion of both exciter patches and at least some parasitic patches, the self contained antenna assembly 404 may need to be sized to accommodate the desired spacing between respective ones of the exciter patches and the parasitic patches. In addition to enforcing a relative distance between the respective patches, the space between the respective patches can allow for a dielectric material to be positioned therebetween. In some cases the dielectric material will include an air filled gap. In other instances, an alternate substance other than or in addition to air can be used for the dielectric material. In either instance, the additional internal spacing requirements, can cause one of the dimensions of the self contained assembly 404, such as depth, d, to be larger. Further, an additional spacing external to the assembly 404 may be needed to ensure that certain external elements do not encroach too closely to the overall structure of the assembly 404. For example, it may be necessary for a gap, g, to exist between the self contained antenna assembly 404 and an external element, such as certain portions of the housing 504 of the device 200.

Similar to FIG. 4, the self contained antenna assembly 404 can be coupled to corresponding circuit elements 408 for supporting wireless signaling via a wired connection 406. All or some of the corresponding circuit elements 408 could be located on a circuit substrate 502.

Figure 6:
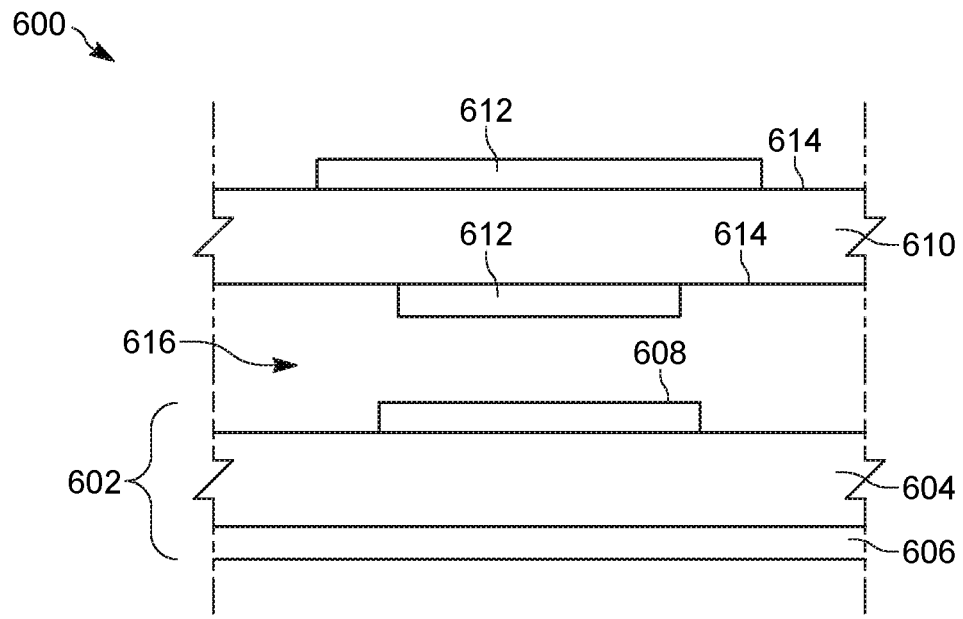
FIG. 6 is a partial side view of a parasitic patch antenna, in accordance with at least one aspect of the present application.

FIG. 6 illustrates a partial side view 600 of a parasitic patch antenna, in accordance with at least one aspect of the present application. In the illustrated embodiment, the parasitic patch antenna has an antenna module 602, which includes an antenna substrate 604, where on one surface of the antenna substrate 604, the antenna module 602 includes a ground structure, such as a ground plane 606, and on the other surface of the antenna substrate 604, the antenna module 602 includes one or more exciter patches 608. The parasitic patch antenna further includes a separate mechanical part, such as a separate substrate and/or superstrate 610, upon which one or more parasitic patches 612 can be placed. The associated one or more parasitic patches 612 can be positioned on one or more of the surfaces 614 of the separate substrate and/or superstrate 610. The separate substrate and/or superstrate 610 is physically distinct, spaced apart, and separate from the antenna module. The physical separation allows for a gap to exist between the two elements and correspondingly a gap 616 to exist between any respectively associated exciter patches and parasitic patches. The gap can be filled with a dielectric, such as air, which can support the performance of the parasitic patches, which in turn provides a dielectric and/or capacitive loading relative to a signal being applied to the exciter patch of the antenna module 602. In turn, this can be used to improve the frequency response of the antenna structure, as well as compensate for any frequency detuning associated with the proximity of other elements relative to the antenna structure.

In at least some instances, the separate mechanical part can be included as part of an external housing for the wireless communication device, where the parasitic patches can be positioned on one or more of an internal or an external surface of the housing. It is further possible that the separate mechanical part could be a part of the internal housing structure, or as part of a separate antenna carrier with the parasitic patches being located on one or more of its corresponding surfaces.

Figure 7:
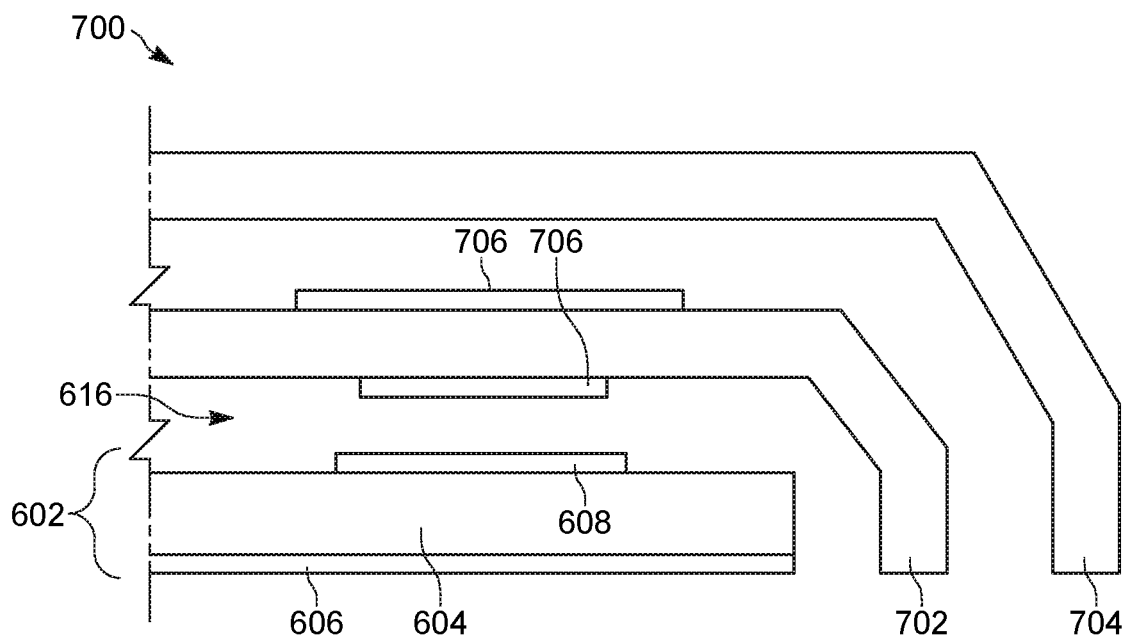
FIG. 7 is a partial side view of a parasitic patch antenna in accordance with a further aspect of the present application.

FIG. 7 illustrates a partial side view 700 of a parasitic patch antenna in accordance with a further aspect of the present application. The partial side view 700 illustrates an antenna carrier 702, which is separate from the antenna module 602 and which is internal to an external housing 704, where at least some of the one or more parasitic patches 706 are present on the antenna carrier 702. The parasitic patches are positioned to interact with the exciter patches 608 of an antenna module 602. In such an instance, while it is not shown, it is possible for parasitic patches to be present on the external housing 704 of the device, in addition to being present on the separate antenna carrier 702. A dielectric material, such as air, can be present in the gap between the antenna module 602 and the separate antenna carrier 702, as well as between the separate antenna carrier 702 and the external housing 704.

Figure 8:
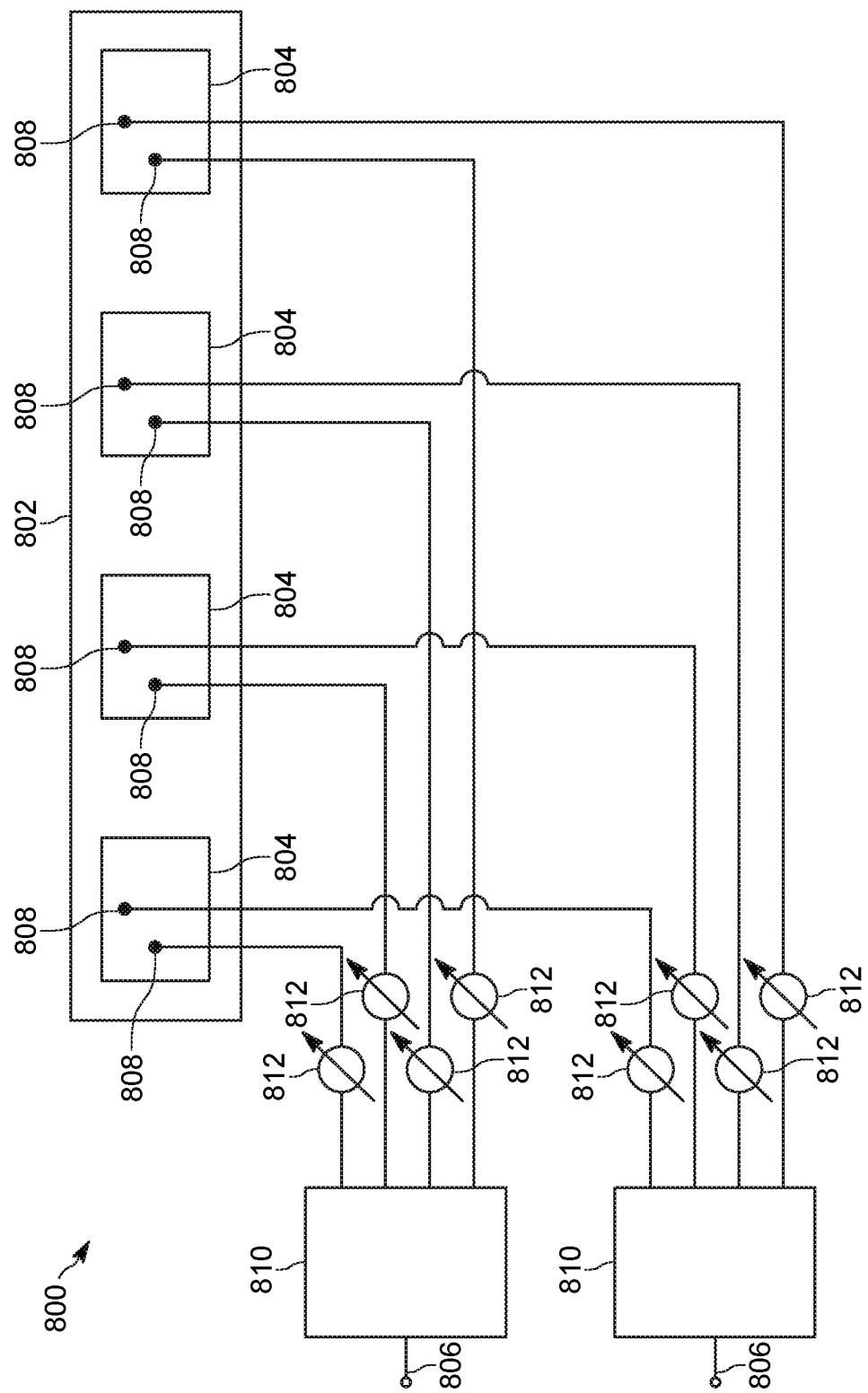
FIG. 8 is a circuit schematic view with a portion of the parasitic patch antenna including a plurality of exciter patches each coupled to a pair of signal ports.

FIG. 8 illustrates a circuit schematic view 800 with a portion of the parasitic patch antenna 802 including a plurality of exciter patches 804 each of which are coupled to a pair of respective signal ports 806. The respective signal ports 806 can each be associated with one of a transmitter, a receiver, or a transceiver. Each of the exciter patches 804 of the parasitic patch antenna 802 can have one or more signal feed points 808. In the particular embodiment illustrated, each exciter patch 804 has a pair of signal feed points 808. In at least some instances, the disparate signal feed points, each have a respective difference in location relative to the overall structure of the same exciter patch 804. In at least some instances, the use of alternative spatially distinct feed points can each have a sufficient degree of non-correlation in order to effectively function as a distinct antenna element, which in turn can respectively produce a wireless signal which appears to come from a distinct signal source.

In the illustrated embodiment, the exciter patches 804 include multiple closely spaced microstrip patches, each of which can include multiple signal feed points 808. Each of the respective signal feed points 808 of each of the exciter patches 804 can be coupled to the same or a different signal source. In the illustrated embodiment, a corresponding one of the multiple signal feed points 808 of the set of exciter patches 804 is coupled to a signal port 806 of one of a transmitter, a receiver, or a transceiver, via a quadplexer 810 and a respective phase shift circuit element 812. The quadplexer 810 can be used to multiplex or demultiplex (i.e. split or combine) a radio frequency signal between a single port and multiple ports. The phase shift circuit element 812 can then be used to control the relative phase shift of the particular signal being applied to each of the exciter patches 804. In this way, it may be possible to form and correspondingly steer a particular signal beam. The four exciter patches 804 can be used to support signal diversity or MIMO (multiple input multiple output) signaling. The other one of the multiple signal feed points 808 of the set of exciter patches can be coupled to another signal source.

Figure 9:
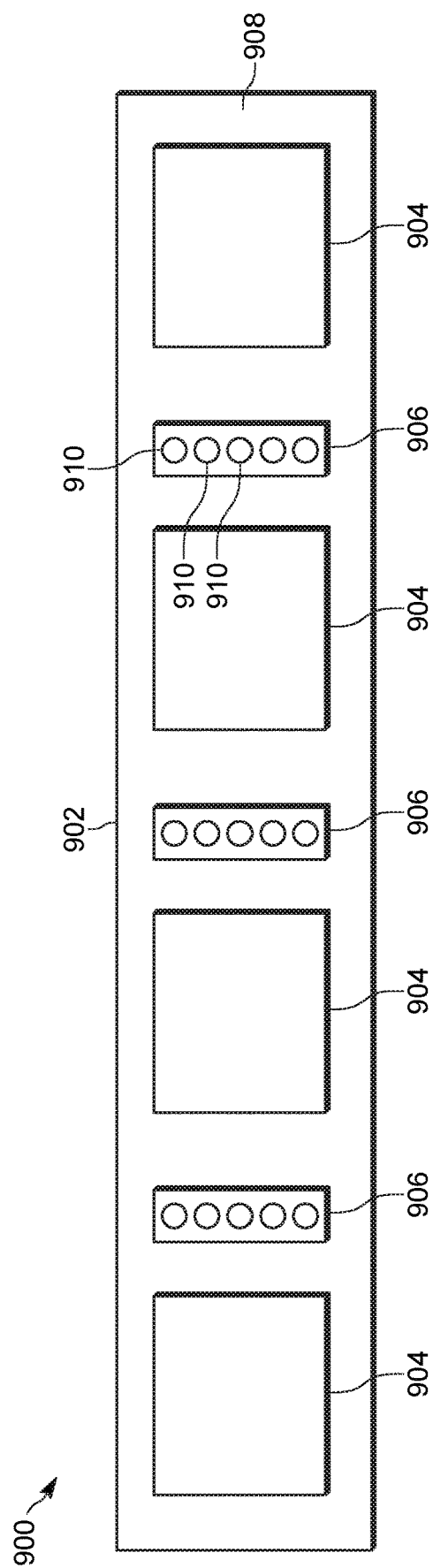
FIG. 9 is a top plan view of a portion of a parasitic patch antenna including a plurality of parasitic patches, and a plurality of conductive stubs.

FIG. 9 illustrates a top plan view 900 of a separate mechanical part 902 of a parasitic patch antenna, which can include a plurality of parasitic patches 904, and a plurality of conductive stubs 906, separate from the antenna module that includes the one or more exciter patches. The parasitic patches 904 are present on a carrier surface 908, such as a substrate or superstrate surface, which can include a portion of the external device housing or other mechanical structure separate from the antenna module. Similar to the exciter patches 804 illustrated in FIG. 8, the parasitic patches can include multiple closely spaced microstrip patches. Each of the parasitic patches are generally associated with at least one of the exciter patches, with its particular location relative to the respective exciter patch impacting the nature of any corresponding parasitic coupling of a reactive load. As mentioned previously, the parasitic patches can be used to compensate for frequency detuning that might result from the placement of the antenna assembly within a device.

Similarly conductive stubs can be used to adjust the performance of the individual antenna elements within the antenna structure. For example, the stubs can be used to help reduce the mutual coupling in selective bands, and/or can be used to improve impedance bandwidth. In at least the illustrated embodiment, the stubs can each include one or more vias 910 which can extend through the underlying structure associated with the carrier surface 908.

Figure 10:
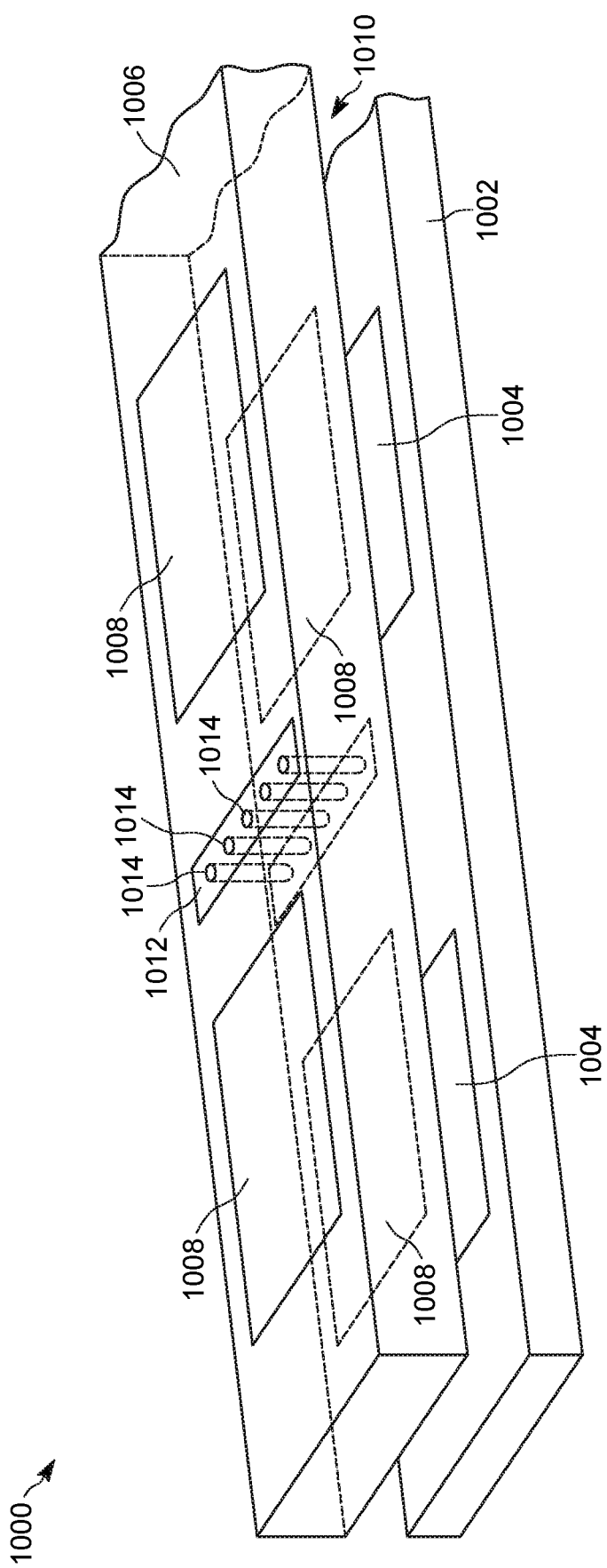
FIG. 10 is a partial perspective view of a parasitic patch antenna, in accordance with at least one aspect of the present application.

FIG. 10 illustrates a partial perspective view 1000 of a parasitic patch antenna for radiating or receiving a wireless signal, in accordance with at least one aspect of the present application. The parasitic patch antenna can include an antenna module 1002, which can have one or more exciter patches 1004. The parasitic patch antenna can further include a separate mechanical part 1006 independent of the antenna module 1002. The separate mechanical part 1006 can have one or more parasitic patches 1008, organized and arranged separate from, and proximate to the one or more exciter patches 1004 of the antenna module 1002.

The parasitic patches 1008 can be positioned on multiple surfaces of the separate mechanical part 1006. A dielectric, such as air, will generally be present in the gap 1010 between the respective exciter patches 1004 and the corresponding parasitic patches 1008. The separate mechanical part 1006 can further include conductive stubs 1012, positioned between adjacent ones of the one or more parasitic patches 1008. The conductive stubs 1012 can include one or more vias 1014, which extend through the underlying structure associated with the separate mechanical part 1006.

When the parasitic patches are associated with an external housing of the device, the corresponding portion of the housing will generally be comprised of a conductive material, such as metal. The various patches and stubs are also formed from a conductive material.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A parasitic patch antenna for radiating or receiving a wireless signal, the parasitic patch antenna comprising:
    an antenna module including one or more exciter patches, each exciter patch being respectively coupled to a signal port of one of a transmitter, a receiver, or a transceiver, and a ground structure; and a separate mechanical part independent of the antenna module, the separate mechanical part including one or more parasitic patches organized and arranged separate from, and proximate to the one or more exciter patches of the antenna module;

wherein the separate mechanical part includes conductive stubs positioned between adjacent ones of the one or more parasitic patches.

2. The parasitic patch antenna of claim 1, wherein the separate mechanical part is included as part of an external housing for a wireless communication device.

3. The parasitic patch antenna of claim 2, wherein the wireless communication device is a hand-held radio frequency telephone.

4. The parasitic patch antenna of claim 2, wherein the one or more parasitic patches are positioned on a surface of the external housing.

5. The parasitic patch antenna of claim 4, wherein at least some of the one or more parasitic patches are positioned on an internal surface of the external housing.

6. The parasitic patch antenna of claim 4, wherein at least some of the one or more parasitic patches are positioned on an external surface of the external housing.

7. The parasitic patch antenna of claim 2, wherein an air gap exists between the antenna module and the part of the external housing including the separate mechanical part.

8. The parasitic patch antenna of claim 1, wherein the separate mechanical part is an antenna carrier.

9. The parasitic patch antenna of claim 8, wherein the one or more parasitic patches are positioned on a surface of the antenna carrier.

10. The parasitic patch antenna of claim 9, wherein at least some of the one or more parasitic patches are positioned on an internal surface of the antenna carrier.

11. The parasitic patch antenna of claim 9, wherein at least some of the one or more parasitic patches are positioned on an external surface of the antenna carrier.

12. The parasitic patch antenna of claim 8, wherein an air gap exists between the antenna module and the antenna carrier.

13. The parasitic patch antenna of claim 8, wherein the antenna module and the antenna carrier are internal to an external housing of a wireless communication device.

14. The parasitic patch antenna of claim 13, wherein an air gap exists between the antenna carrier and the external housing.

15. The parasitic patch antenna of claim 1, wherein the one or more exciter patches include multiple closely spaced microstrip patches.

16. The parasitic patch antenna of claim 1, wherein the one or more parasitic patches include multiple closely spaced microstrip patches.

17. The parasitic patch antenna of claim 1, wherein at least some of the conductive stubs includes one or more vias.

18. The parasitic patch antenna of claim 1, wherein the signal port of one of the transmitter, the receiver, or the transceiver are incorporated as part of a radio frequency integrated circuit that is included as part of the antenna module.

19. A parasitic patch antenna for radiating or receiving a wireless signal, the parasitic patch antenna comprising:

an antenna module including one or more exciter patches, each exciter patch being respectively coupled at a first point along the surface of the respective exciter patch to a first signal port of one of a first transmitter, a first receiver, or a first transceiver, and a ground structure; and a separate mechanical part independent of the antenna module, the separate mechanical part including one or more parasitic patches organized and arranged separate from, and proximate to the one or more exciter patches of the antenna module;

wherein each exciter patch of the one or more exciter patches are respectively coupled at a second point different than the first point along the surface of the respective exciter patch to a second signal port different than the first signal port, the second signal port being associated with one of a second transmitter, a second receiver, or a second transceiver, which is different than the one of the first transmitter, the first receiver, or the first transceiver, for receiving or radiating a second wireless signal.

* * * * *